Sept. 24, 1963   A. F. OLD   3,105,103
APPARATUS FOR TREATING A GASEOUS MIXTURE
Filed Oct. 28, 1957
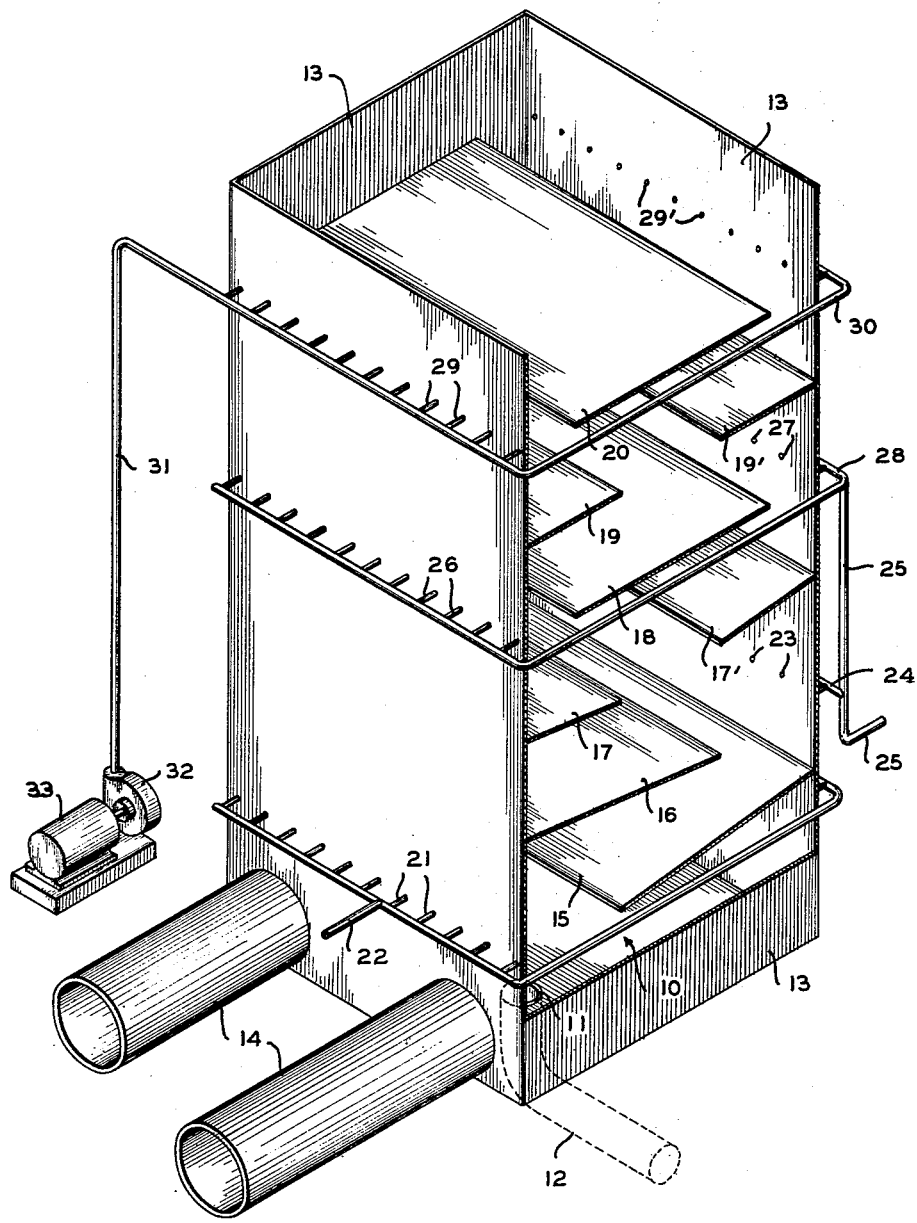
INVENTOR
A. F. OLD
BY
ATTORNEY United States Patent Office 3,105,103
Patented Sept. 24, 1963

3,105,103
APPARATUS FOR TREATING A GASEOUS MIXTURE
Albert Floyd Old, Bremo Bluff, Va., assignor to Solite Corporation, Richmond, Va.
Filed Oct. 28, 1957, Ser. No. 692,735
4 Claims. (Cl. 261—16)

This invention relates to the treatment of gaseous mixtures and to the removal of injurious substances therefrom. The invention is concerned particularly with the treatment of the discharge from kilns in which materials are subjected to relatively high temperatures for expanding the same and reducing their specific gravities with a resultant release of chemical substances of various kinds in which are contained fine particles of solids or dust.

In large operations the amount and character of the discharge constitutes a substantial problem and much time and effort have been expended in attempting to find a solution of the problem. These efforts have included attempts to remove undesirable and harmful ingredients by treatment of the mixtures in various media both dry and wet including those disclosed in Patent 2,696,274 as well as in Patent 2,922,490. Said patents provide additional facilities for treatment of the gaseous mixture and such treatment is useful in contributing to the accomplishment of the desired result. They are not, however, universally applicable due, for example, to the condition of lack of available space other than in any position except upright.

It is an object of the invention to provide a system for the removal of harmful gases from a gaseous mixture which system includes an upright separation chamber for treating the mixture to relieve it of solids and harmful gases so that only a harmless mixture will be left.

Another object of the invention is to provide a treating chamber including mechanism for handling a gaseous mixture containing undesirable and harmful substances and solid matter in varying amounts and to the treatment thereof in a manner not only to insure the removal of the undesirable and harmful substances but to utilize the forces of nature to accomplish this and other results including the reduction of the amount of water used, and rendering more efficient the operation of the system.

A further object of the invention is to provide a system of the character indicated in which the parts are so constructed and arranged that each will contribute to the accomplishment of the desired result.

Other objects and advantages of the invention will be apparent from the following description taken in conjunction with the accompanying drawing wherein:

The FIGURE is a perspective with parts broken away to illustrate one application of the invention, with a wall broken away to expose interior portions.

Briefly stated the invention comprises a system for the treatment of gaseous mixtures, including a treating chamber disposed in vertical or upright position, an inlet in its side near the bottom, and a discharge for solid matter through a drain from the center of the bottom, the upper end of the chamber being open for the discharge of gas from which undesirable and harmful substances have been removed.

Within the treating chamber are located a series of baffles which provide a circuitous passage for the flow of the gaseous mixture treated and the baffles are arranged in such a manner that they allow substantially uniform flow from bottom to top.

The treating chamber also is provided with steam jets within the lower portion thereof certain of which jets are located beneath the lowermost baffle for protection from water sprayed downwardly in said chamber at a higher elevation through a series of spaced spray nozzles.

Near the top of the chamber is mounted a series of spray nozzles with pressure means for spraying water at high pressure in order to remove excess water from the gas before it is discharged from the chamber. Also at the upper end of the chamber is mounted a series of baffles having flow passages for directing final discharge of the denatured gas centrally from the chamber.

With continued reference to the drawings the treating chamber of the present invention comprises a bottom 10 having a depressed opening 11 through which solid particles and liquid may be discharged, and to which if desired a discharge pipe 12 may be connected.

A series of upright walls 13 of substantial height form a chamber of substantial height or vertical dimension, within the lower end of which chamber a gaseous mixture to be treated is adapted to be admitted through pipes 14.

A series of baffles 15, 16, 17, 17', 18, 19, 19' and 20 are mounted in vertically spaced relation within the treating chamber. The lowermost of the baffles 15 extends from the wall opposite the side of the chamber through which the mixture is admitted outwardly substantially two-thirds the width of the chamber and slightly above the admission pipes 14 so that the gaseous mixture upon being admitted will travel to the opposite side of the treating chamber into contact with the underside of such baffle after which it will travel in a reverse direction and then upwardly around the inner edge of the baffle 15.

After the gaseous mixture has traveled around the edge of the baffle 15 it travels upwardly around the remaining baffles until it is discharged from the top of the chamber, devoid of its undesirable and harmful ingredients.

In the lower portion of the treating chamber a series of steam jets 21 is provided and supplied with steam from a source 22, and these steam jets 21 provide a blanket or vast body of steam which intimately engages the gaseous mixture as it is introduced into the treating chamber. The steam jets 21 are so arranged that the steam discharged fills the space between the inner edge of the downwardly inclined baffle 15 and the adjacent wall of the chamber and thereby insure intimate contact between the mass of steam and the mixture to be treated.

After contact with the steam the mixture travels between the downwardly inclined baffles 15 and 16 upwardly around the edge of the latter where it is subjected to water sprays from nozzles 23 supplied with water from a pipe or header 24 which receives water from a supply line 25. Then the treated mixture travels upwardly between downwardly inclined baffles 17—17' into contact with baffle 18 and around the edges of this baffle where it comes in contact with sprays of water from nozzles 26 and 27 supplied by header 28 from the line 25. The mixture passes upwardly between the baffles 19—19' into contact with and around the edges of baffle 20. The mixture then comes in contact with high pressure water sprays through nozzles 28 and 29 connected to a header 30 and a supply line 31 connected to a pump 32 driven by a motor 33. The water used in the system may be collected and used over and over again.

From the foregoing it will be apparent that gaseous mixture admitted through the pipes 14 into the treating chamber will travel to the opposite side of the treating chamber beneath the baffle 15 and will be subjected to steam from the jets 21 causing it to lose a substantial portion of its solid material and some of its chemical substances. The gaseous mixture will then travel upwardly through the steamcloud around the free edge of the baffle 15, then in a circuitous path around the baffle 16, into contact with the water sprays from the nozzles 23, then between the baffles 17—17', against and around the baffle 18 into contact with the water sprays from the nozzles 27, then between the baffles 19—19' into contact with and around the edges of the baffle 20, and into contact with the high pressure water sprays from the nozzles 29.

In its travel the gaseous mixture has had all but a negligible amount of its solid matter and undesirable and harmful ingredients removed. Water falling downwardly within the chamber from the water shed forming baffles provides a curtain at the free edges of each of the baffles and the provision of this series of curtains assists in the removal of the objectionable solids and gaseous substances which are flushed away through the drain 11. The exposed surfaces within the treating chamber preferably are provided with surfaces which will not be materially affected by the caustic nature of the gaseous mixtures treated and thus can be varied in accordance with the nature of the mixture treated as by the use of a resistant plastic coating on such surfaces.

This upright embodiment of the invention saves space, affords a more thorough treatment of the gas and solid mixture, due to the manner of treatment of the mixture and the provision of curtains of water at the ends of the baffles, affords increased contact of water and mixture, and yields more efficient water consumption, since the water is used over and over. Fallout is aided and increased by the upward travel of some of the moisture and the help of gravity, and there is less friction due to the travel in a vertical path instead of a horizontal path. Since the sprays are arranged at the ends of the baffles in the planes of the baffles, a curtain may be maintained with a saving of water. Steam is protected by the baffles from the water above and the inlet of the mixture is projected beneath one of the baffles.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. In a system for the treatment of a gaseous mixture to remove harmful substances therefrom, the combination of a relatively tall treating chamber having an inlet for the gaseous mixture near its bottom and a drain from its bottom, a series of baffles located along the height of said chamber defining a serpentine passage for the flow of the gaseous mixture during treatment, said baffles being located in a manner to allow substantially uniform flow from the bottom to the top of said chamber, steam jets for introducing steam into the lower end portion of said chamber for contact with the gaseous mixture admitted into said chamber, water sprays in said chamber at a higher elevation than the area in which steam is admitted into said chamber on a level with and opposite the free edge of a baffle, and a high pressure water spray at a higher elevation than the area in which water is admitted to said chamber on a level with and opposite the free edge of another baffle.

2. A system for the treatment of mixtures of gases and solids including a vertical treating chamber having a mixture inlet in its side near the bottom and a drain in its bottom, the upper end of the chamber having an opening for the discharge of gases after the mixture has been treated, a series of baffles at successively higher elevations in said chamber with the baffles arranged to provide a circuitous path for the mixture as it travels upwardly through the chamber, and the baffles providing narrow passageways between free edges of the baffles and the adjacent walls of the chamber, and water sprays at successively higher elevations in the chamber located on levels with the baffles and opposite said free edges of the baffles so as to place a water curtain directly across the passageways afforded between the baffles and the adjacent walls of the chamber.

3. A system for the treatment of mixtures of gases and solids including a vertical treating chamber having a mixture inlet in its side near the bottom and a drain in its bottom, the upper end of the chamber having an opening for the discharge of gases after the mixture has been treated, a series of baffles at successively higher elevations in said chamber with the baffles arranged to provide a circuitous path for the mixture as it travels upwardly through the chamber, and the baffles providing narrow passageways between free edges of the baffles and the adjacent walls of the chamber, steam jets beneath the lowermost baffle and above the inlet to initially saturate the mixture and remove some of the solids and gases from the mixture and water sprays at successively higher elevations in the chamber located on levels with the baffles and opposite said free edges of the baffles so as to place a water curtain directly across the passageways afforded between the baffles and the adjacent walls of the chamber.

4. A system for the treatment of mixtures of gases and solids including a vertical treating chamber having a mixture inlet near the bottom and a drain in its bottom, the upper end of the chamber having an opening for the discharge of gases after the mixture has been treated, a series of baffles at successively higher elevations in said chamber with the baffles arranged to provide a circuitous path for the mixture as it travels upwardly through the chamber, and the baffles providing narrow passageways between free edges of the baffles and the adjacent walls of the chamber, water sprays extending through the walls of the chamber, at successively higher elevations and located on levels with the baffles and opposite said free edges of the baffles, so as to place a water curtain directly across said passageways.

References Cited in the file of this patent

UNITED STATES PATENTS

| | | |
|---|---|---|
| 138,195 | Rick | Apr. 22, 1873 |
| 203,003 | Cross | Apr. 30, 1878 |
| 1,112,860 | Smith | Oct. 6, 1914 |
| 1,563,125 | Ward | Nov. 24, 1925 |
| 1,734,677 | Kreisinger | Nov. 5, 1929 |
| 2,080,713 | Hayes | May 18, 1937 |
| 2,186,125 | Roberts | Jan. 9, 1940 |
| 2,539,992 | Cover | Jan. 30, 1951 |
| 2,696,274 | Old | Dec. 7, 1954 |
| 2,810,450 | Hartmann | Oct. 22, 1957 |